United States Patent
Ju et al.

(10) Patent No.: US 9,487,186 B2
(45) Date of Patent: Nov. 8, 2016

(54) VEHICLE WIPER MOTOR UNIT ASSEMBLY WITH IMPROVED ASSEMBLABILITY

(71) Applicant: DY AUTO Corporation, Asan-si (KR)

(72) Inventors: Tae Hoon Ju, Incheon (KR); Ki Yoon Hong, Seoul (KR)

(73) Assignee: DY AUTO Corporation (KR)

( * ) Notice: Subject to any disclaimer, the term of this patent is extended or adjusted under 35 U.S.C. 154(b) by 0 days.

(21) Appl. No.: 14/676,144

(22) Filed: Apr. 1, 2015

(65) Prior Publication Data
US 2015/0291132 A1    Oct. 15, 2015

(30) Foreign Application Priority Data

Apr. 14, 2014 (KR) ........................ 10-2014-0044428

(51) Int. Cl.
*B60J 1/00* (2006.01)
*B60S 1/04* (2006.01)

(52) U.S. Cl.
CPC ............ *B60S 1/0438* (2013.01); *B60S 1/0447* (2013.01); *B60S 1/0444* (2013.01)

(58) Field of Classification Search
CPC ... B60S 1/0438; B60S 1/0447; B60S 1/0444
See application file for complete search history.

(56) References Cited

U.S. PATENT DOCUMENTS

| 5,986,371 A * | 11/1999 | Savy ................. B60S 1/3415 15/250.01 |
| 2002/0162184 A1* | 11/2002 | Shido ................ B60S 1/0425 15/250.31 |
| 2007/0011839 A1 | 1/2007 | Princet et al. |

FOREIGN PATENT DOCUMENTS

| JP | 2012046104 A | 3/2012 |
| KR | 1020010072421 A | 7/2001 |
| KR | 1020060123502 A | 12/2006 |
| KR | 1020100034397 A | 4/2010 |
| KR | 101156740 B1 | 6/2012 |

OTHER PUBLICATIONS

Notice of Allowance from the Korean Intellectual Property Office Application No. 10-2014-0044428 Issued: Sep. 22, 2014 8 pages.

* cited by examiner

*Primary Examiner* — Lori L Lyjak
(74) *Attorney, Agent, or Firm* — ST ONGE STEWARD JOHNSTON AND REENS LLC

(57) ABSTRACT

A vehicle wiper motor unit assembly, which is fixed to a vehicle body panel of a vehicle and accommodates a wiper motor unit, includes: a motor fixing portion having a plurality of coupling holes that fix the wiper motor unit; a connection bridge that protrudes from the motor fixing portion toward the vehicle body panel; and a first fixing support portion and a second fixing support portion that are integrally formed at an end portion of the connection bridge and supports a bottom surface of the vehicle body panel and a top surface of the vehicle body panel, respectively, when the motor fixing portion is rotated around a central axis of the wiper motor unit fixed to the motor fixing portion.

5 Claims, 9 Drawing Sheets

VEHICLE WIPER MOTOR UNIT ASSEMBLY WITH IMPROVED ASSEMBLABILITY

FIELD OF THE INVENTION

One or more exemplary embodiments relate to a vehicle wiper motor unit assembly, and more particularly, to a technology applied to a glass wiper apparatus for a vehicle.

BACKGROUND OF THE INVENTION

Bad weather conditions, such as rainfall and snowfall, or dusts or stains on a windshield glass obstruct a driver's field of vision. In this case, a vehicle wiper apparatus is used as a safety apparatus that wipes the dusts or stains with a wiper blade so as to secure a clean view. The wiper apparatus may be installed in a windshield, a rear window, an outside rear view mirror, a head lamp, or the like. In particular, the wiper apparatus installed in the windshield is operated by connecting a pair of wiper blades to a link mechanism by a single motor. An example of the wiper apparatus is disclosed in Korean Patent Application Publication No. 10-2001-0072421.

The wiper apparatus includes a wiper motor used as a driving source, a worm and a worm wheel that convert a torque of the wiper motor and change a rotating direction, and a link mechanism that receives power from the worm wheel and reciprocatingly rotates a wiper blade.

The wiper apparatus is assembled a vehicle body panel by using a bolt and a nut. However, the structure that assembles the wiper apparatus with the vehicle body by using the bolt and the nut may degrade work efficiency. In addition, such a structure needs to weld a weld nut to the vehicle body panel, thus increasing a manufacturing cost of a vehicle.

In order to solve this limitation, several new methods have been proposed. For example, Korean Patent Registration No. 1045773 discloses a wiper apparatus that is fitted into a vehicle body panel in a rotating manner during assembling. However, in such a wiper apparatus, at least one fixing portion has the bolt assembly structure of the related art, thus degrading assembling workability. In addition, since a vibration absorption structure between the vehicle body panel and the wiper apparatus is inferior, a vibration generated during the operation of a wiper may be transferred to a vehicle body.

SUMMARY OF THE INVENTION

One or more exemplary embodiments include a vehicle wiper motor unit assembly that is easy for a worker to assemble and has a remarkably improved vibration absorption structure by improving a structure of a wiper apparatus assembled with a vehicle body panel in a rotating manner without using bolts or screws.

Additional aspects will be set forth in part in the description which follows and, in part, will be apparent from the description, or may be learned by practice of the presented embodiments.

According to one or more exemplary embodiments, a vehicle wiper motor unit assembly, which is fixed to a vehicle body panel of a vehicle and accommodates a wiper motor unit, includes: a motor fixing portion having a plurality of coupling holes that fix the wiper motor unit to the vehicle body panel; a connection bridge that protrudes from the motor fixing portion toward the vehicle body panel; and a first fixing support portion and a second fixing support portion that are integrally formed with the connection bridge at end portions of the connection bridge and, when the motor fixing portion is rotated around a central axis of the wiper motor unit fixed to the motor fixing portion, respectively support a bottom surface of the vehicle body panel and a top surface of the vehicle body panel, wherein, when viewed in a direction of the central axis, one of the first fixing support portion and the second fixing support portion is disposed in a direction tangential to the central axis, and the other of the first fixing support portion and the second fixing support portion extends outward in a radial direction of the central axis, each of the first fixing support portion and the second fixing support portion includes an elastic polymer material, an elastic member is provided on and separable from the first fixing support portion or the second fixing support portion, a through-hole included in the first fixing support portion and a through-hole included in the second fixing support portion respectively fix the elastic member to the first fixing support portion and the second fixing support portion, and the elastic member includes: a flat support portion that comes into contact with the vehicle body panel; and a pillar portion that passes through one of the through-holes and protrudes outward from the first fixing support portion or the second fixing support portion.

The vehicle wiper motor unit assembly may further include a release prevention portion provided in a middle of the pillar portion, and the release prevention portion may be thicker than the through-hole, undergo compressive elastic deformation when passing through at least one of the through-holes, and prevent the elastic member from being released from the through-holes.

The flat support portion may include an elastic deformation guide portion that is concavely formed at a location where the flat support portion and the pillar portion meet, and guides elastic deformation.

The vehicle wiper motor unit assembly may further include a guide protrusion provided in the first fixing support portion or the second fixing support portion and guiding an assembly position of the flat support portion.

The elastic member may include a contact prevention portion that prevents an edge of the vehicle body panel from directly contacting the first fixing support portion or the second fixing support portion.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Figure 1:
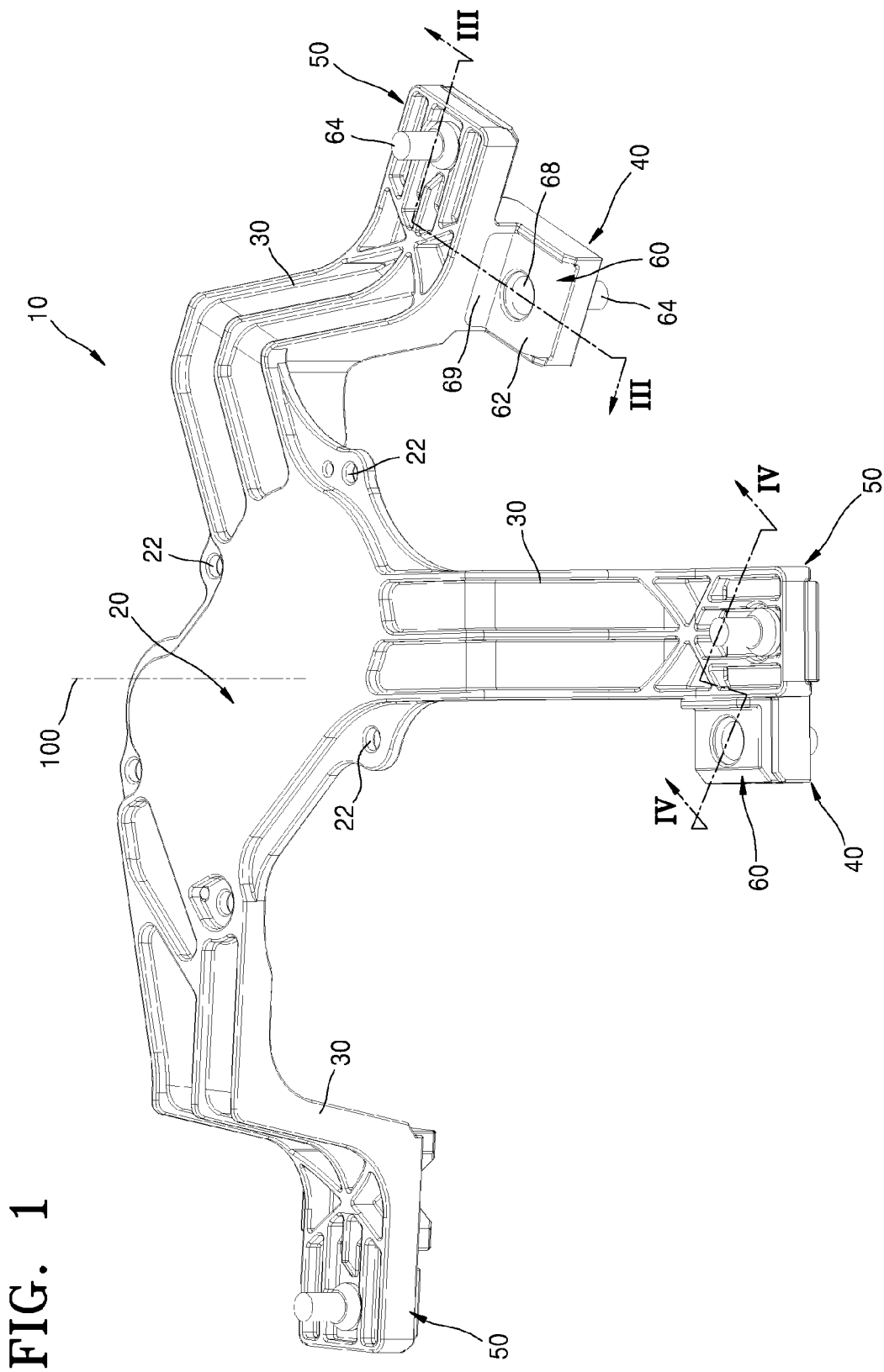
FIG. 1 is a schematic perspective view of a vehicle wiper motor unit assembly according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description.

Figure 2:
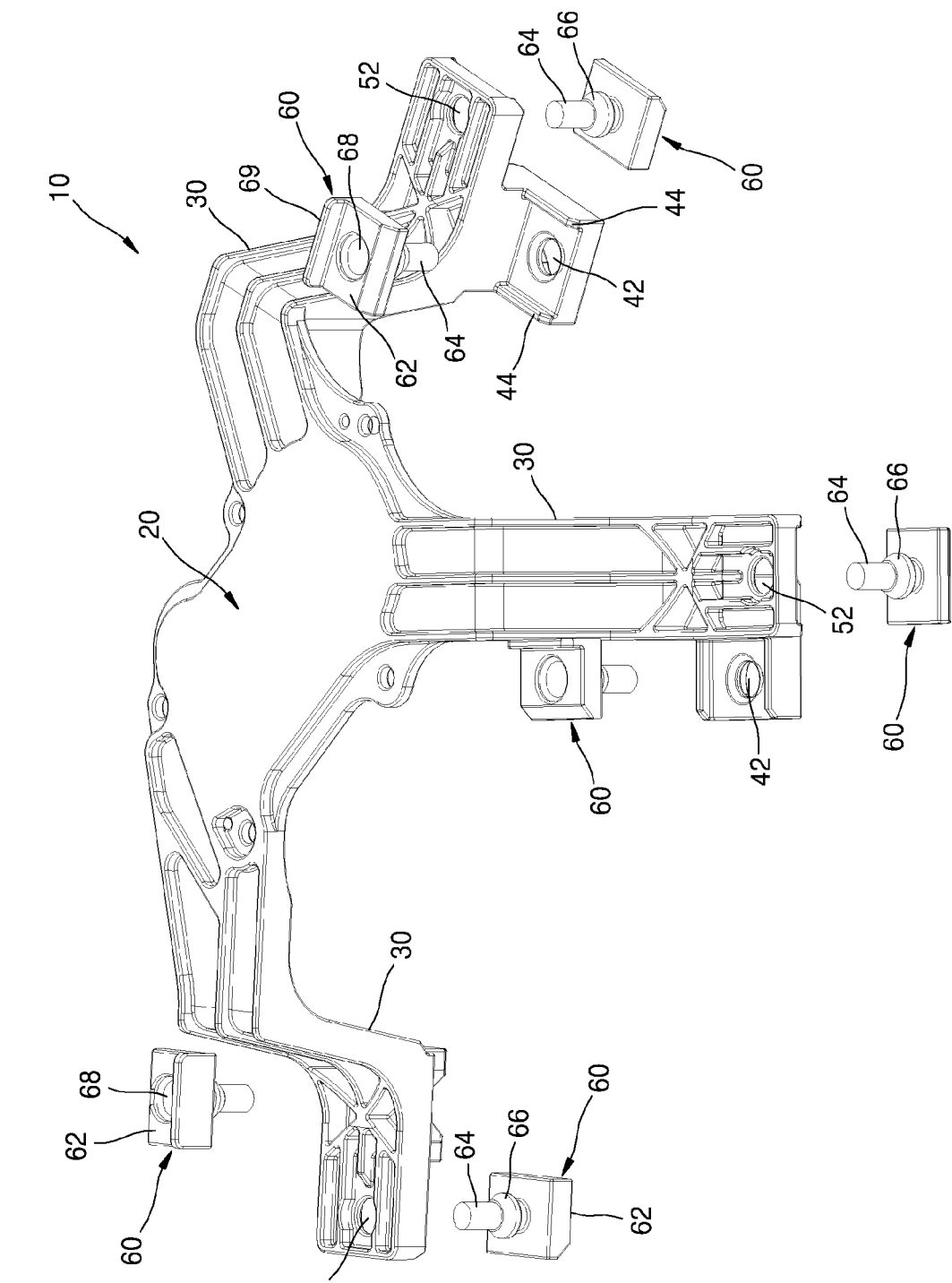
FIG. 2 is an exploded perspective view of the vehicle wiper motor unit assembly illustrated in FIG. 1.
Figure 3:
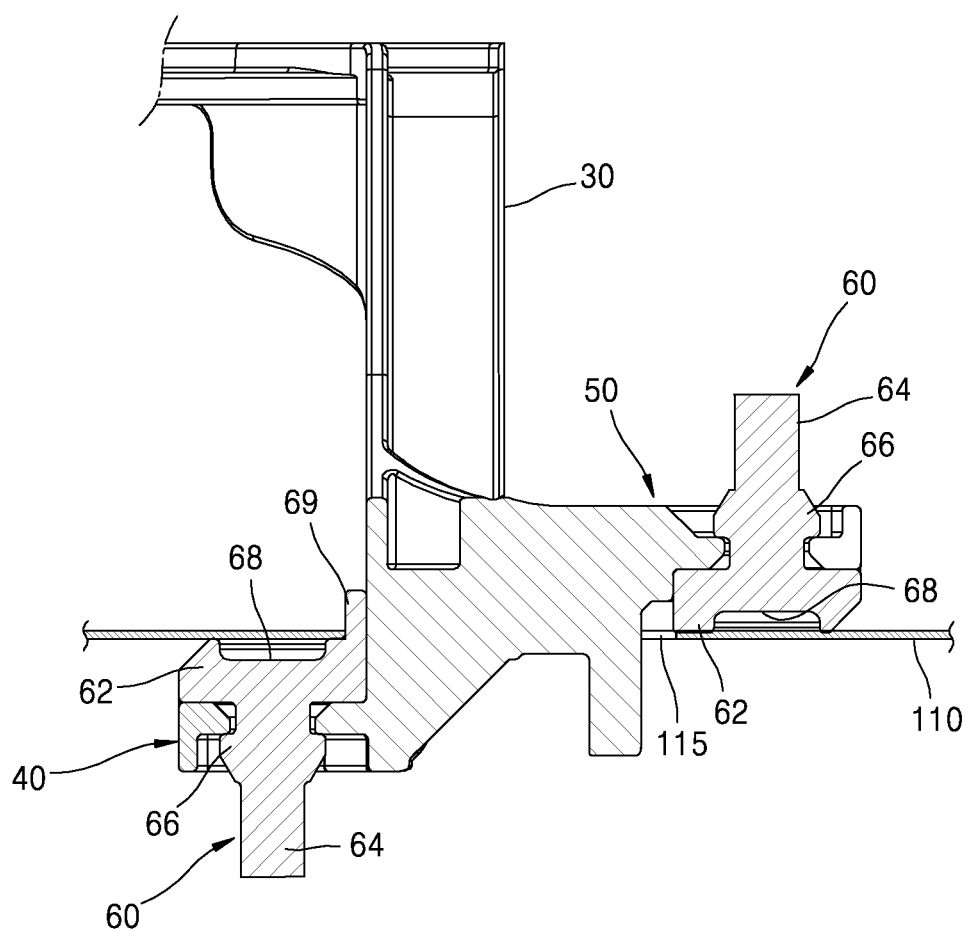
FIG. 3 is a cross-sectional view taken along line III-III of FIG. 1.
Figure 4:
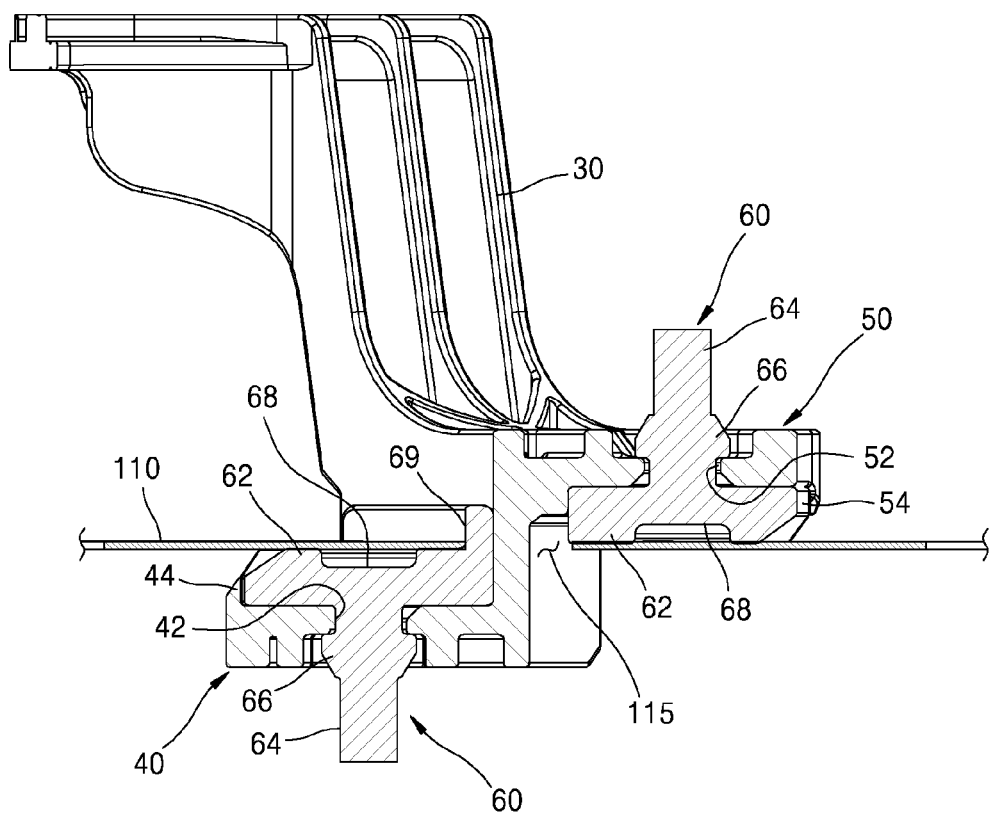
FIG. 4 is a cross-sectional view taken along line IV-IV of FIG. 1.
Figure 5:
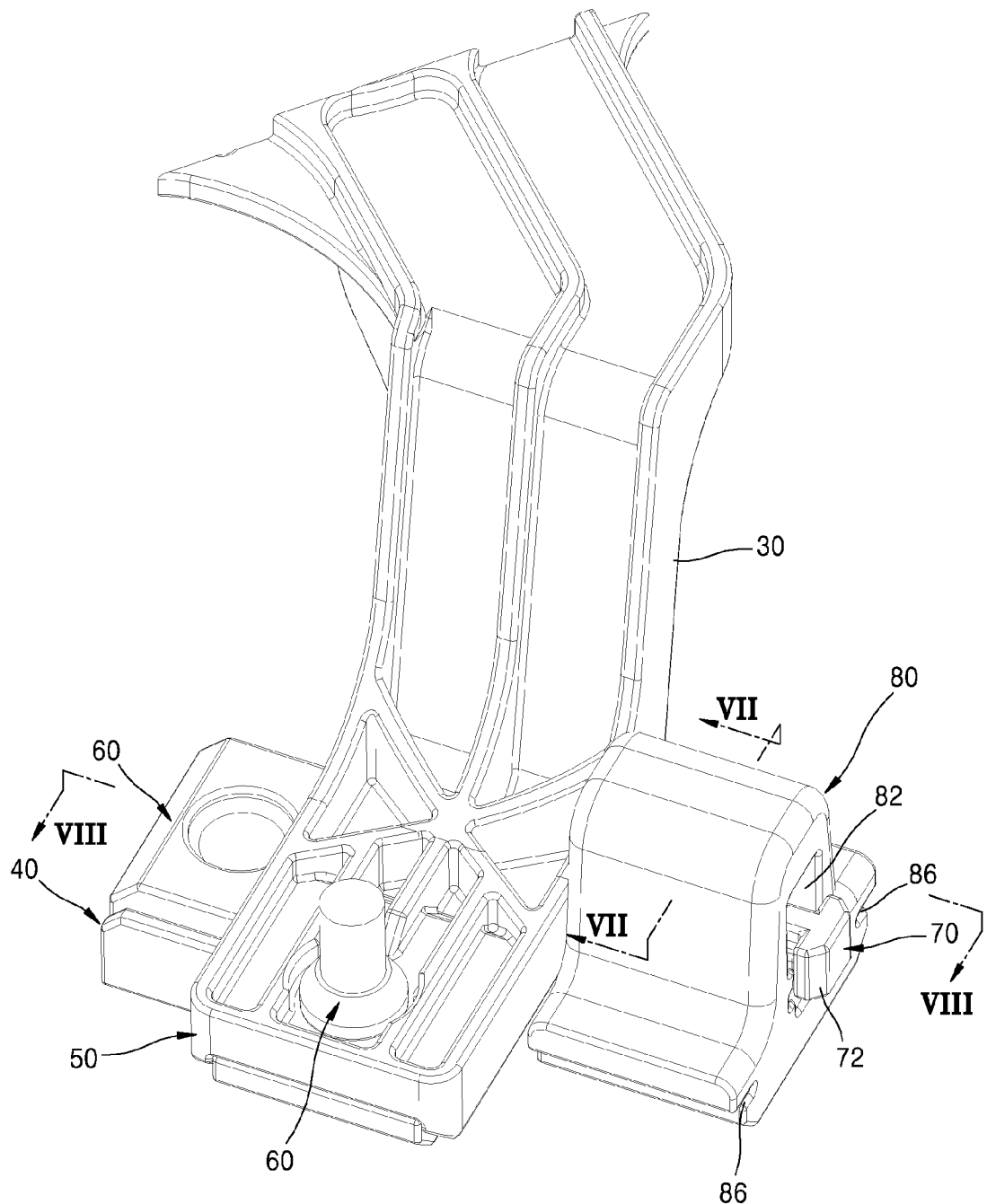
FIG. 5 is a perspective view of a vehicle wiper motor unit assembly according to another exemplary embodiment.
Figure 6:
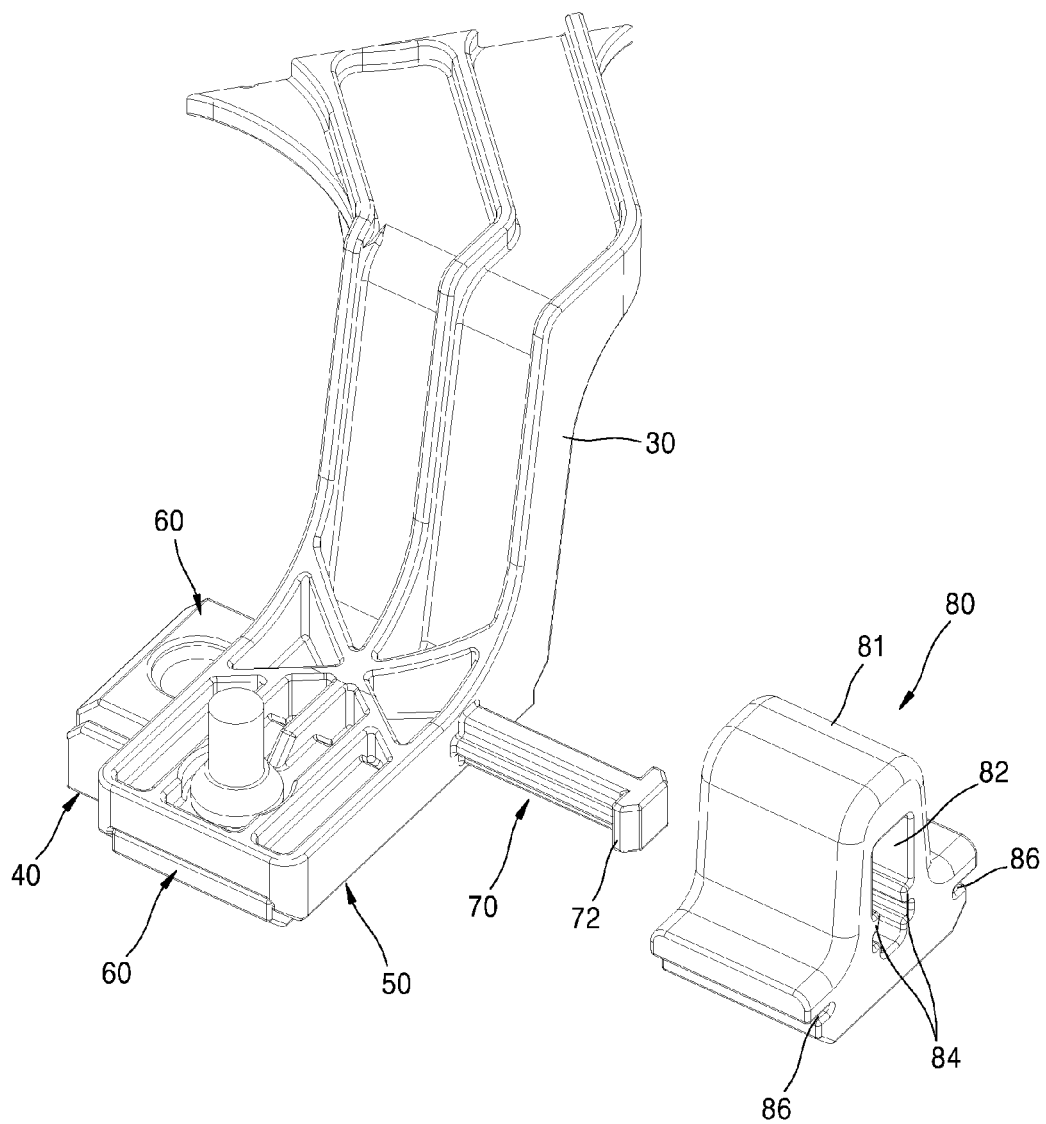
FIG. 6 is an exploded perspective view of a reverse-rotation release prevention block of FIG. 5.
Figure 7:
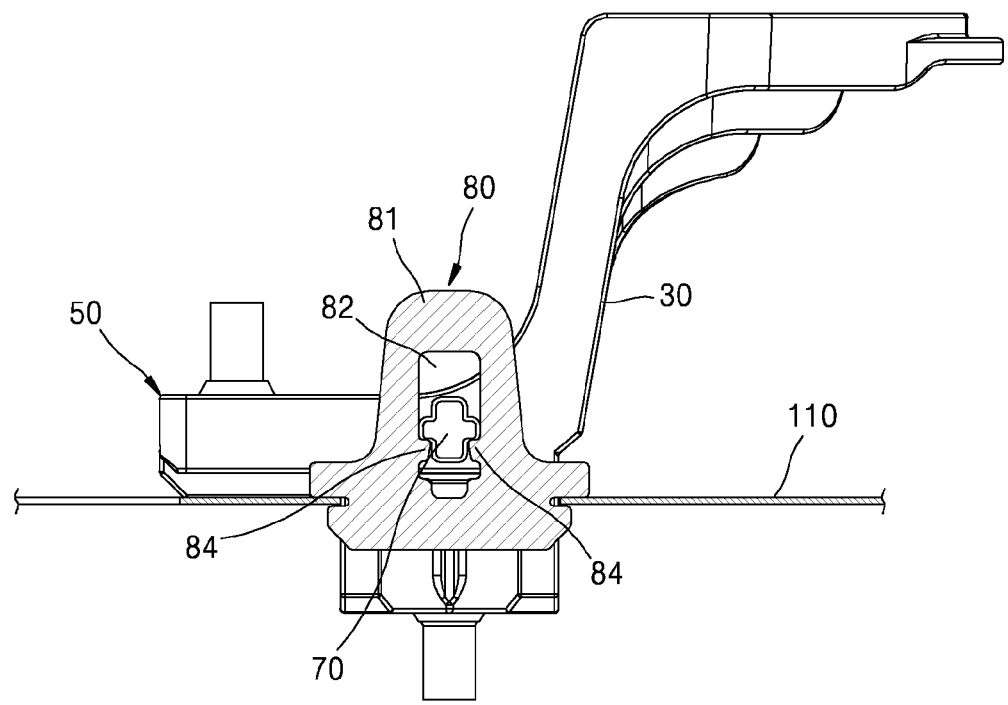
FIG. 7 is a cross-sectional view taken along line VII-VII of FIG. 5.
Figure 8:
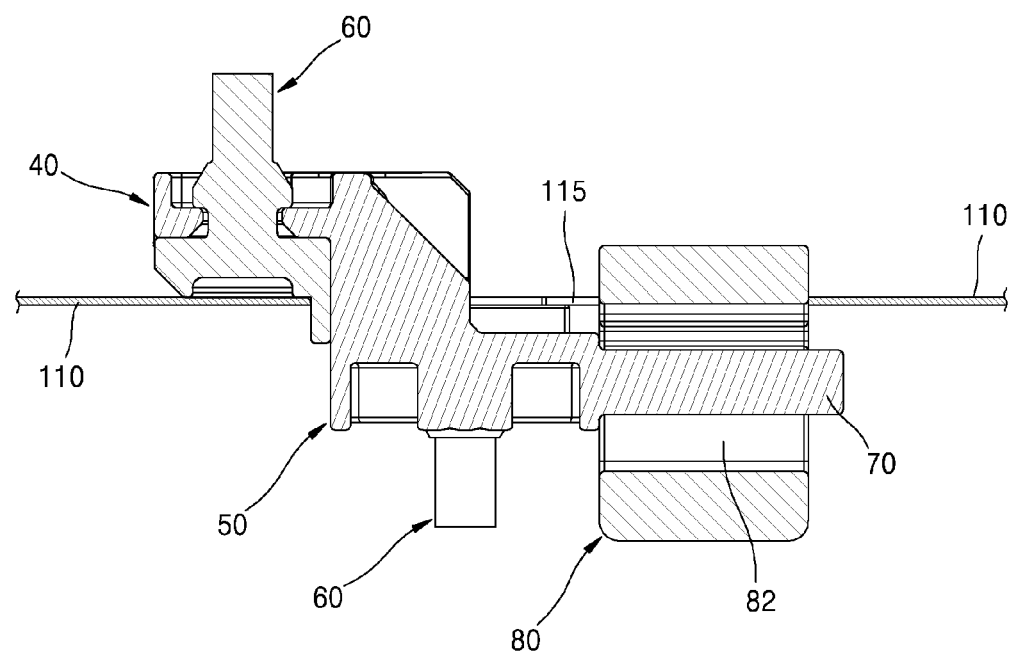
FIG. 8 is a cross-sectional view taken along line VIII-VIII of FIG. 5, which describes an operation of a reverse-rotation release prevention block.
Figure 9:
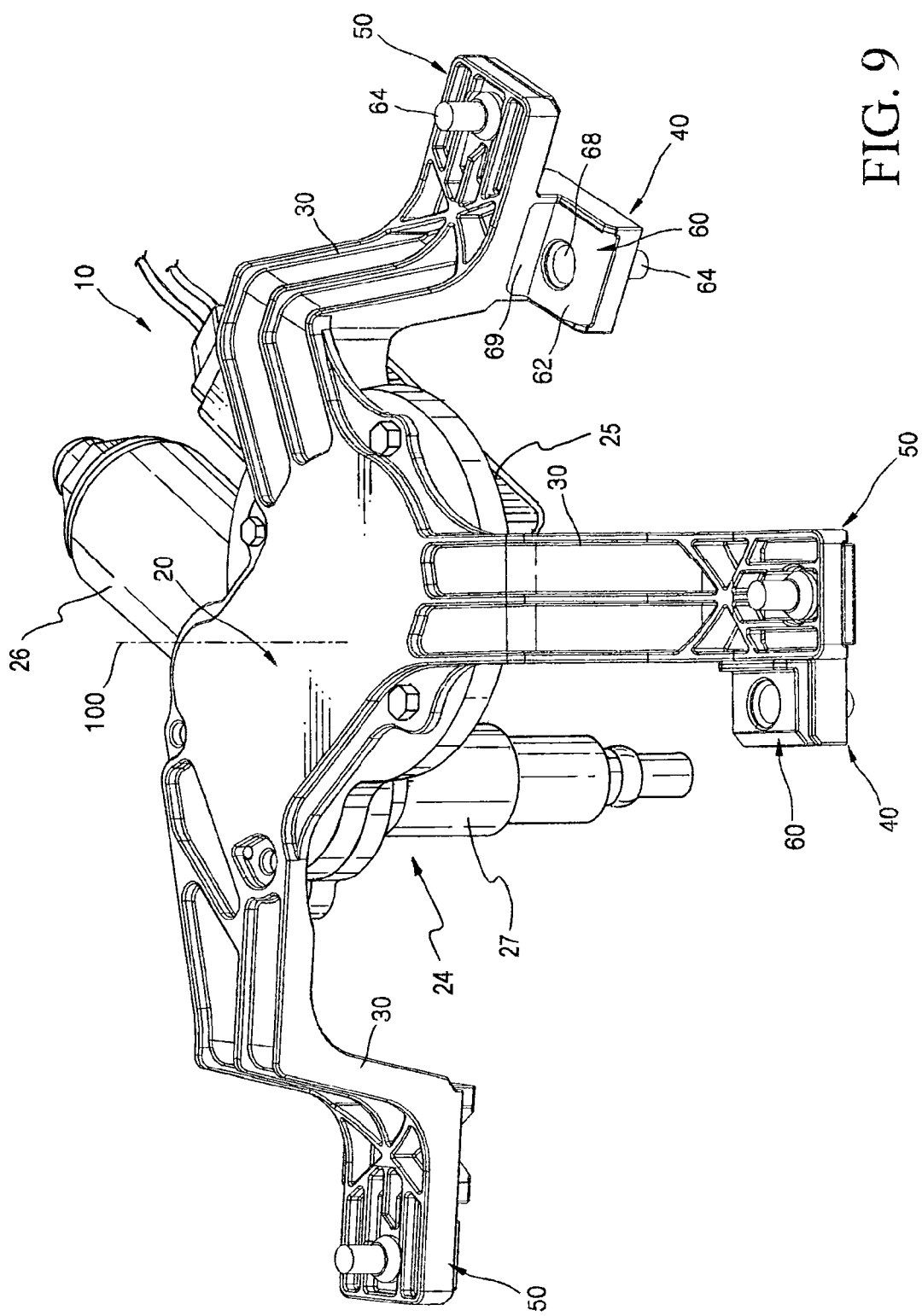
FIG. 9 is a schematic perspective view of the vehicle wiper motor unit assembly illustrated in FIG. 1 including the wiper motor unit.

FIG. 1 is a schematic perspective view of a vehicle wiper motor unit assembly according to an exemplary embodiment. FIG. 2 is an exploded perspective view of the vehicle wiper motor unit assembly illustrated in FIG. 1. FIG. 3 is a cross-sectional view taken along line III-III of FIG. 1. FIG. 4 is a cross-sectional view taken along line IV-IV of FIG. 1. FIG. 5 is a perspective view of a vehicle wiper motor unit assembly according to another exemplary embodiment. FIG. 6 is an exploded perspective view of a reverse-rotation release prevention block of FIG. 5. FIG. 7 is a cross-sectional view taken along line VII-VII of FIG. 5. FIG. 8 is a cross-sectional view taken along line VIII-VIII of FIG. 5, which describes an operation of a reverse-rotation release prevention block.

Referring to FIGS. 1 to 9, a vehicle wiper motor unit assembly 10, which has an improved assemblability, according to an exemplary embodiment is fixed to a vehicle body panel of a vehicle. The vehicle wiper motor unit assembly 10 is an apparatus that includes a wiper motor unit 24. The wiper motor unit assembly 10 includes a wiper motor 26 fixed to a motor fixing portion 20; with a worm wheel unit 25, and a pivot shaft 27 installed along with the wiper motor 25.

The wiper motor unit assembly 10 may include a motor fixing portion 20, connection bridges 30, first fixing support portions 40, second fixing support portions 50, elastic members 60, and reverse-rotation release prevention blocks 80.

The motor fixing portion 20 may include a plurality of coupling holes 22 that fix the wiper motor unit 24. The motor fixing portion 20 may be made of a metal, such as aluminum, by die casting, or may be made of a synthetic resin by injection. The motor fixing portion 20 may be fixed in such a state that the wiper motor 26, the worm wheel unit 25, and the pivot shaft 27 are pre-assembled in a single wiper motor unit 24. The wiper motor unit 24 may be fixed to the coupling holes 22 by a fastener, such as a screw or a bolt. The pivot shaft may be substantially aligned with a central axis 100 to be described below. The central axis 100 is a virtual rotational shaft and is an axis that serves as a center of rotation when the wiper motor unit assembly 10 is assembled with the vehicle body panel 110 in a rotating manner.

The connection bridge 30 is a rod-shaped member that protrudes from the motor fixing portion 20 toward the vehicle body panel 110. The connection bridge 30 may be integrally formed with the motor fixing portion 20. The connection bridge 30 may include a plurality of reinforcement ribs. The connection bridge 30 may extend in a direction substantially perpendicular to a plane constituting the motor fixing portion 20. A plurality of connection bridges 30 may be provided. In the present exemplary embodiment, three connection bridges 30 are provided.

The first fixing support portion 40 may be integrally formed with an end portion of the connection bridge 30. The first fixing support portion 40 may extend in a direction parallel to the vehicle body panel 110. The second fixing support portion 50 may extend in a direction perpendicular to the first fixing support portion 40. In addition, the second fixing support portion 50 may extend in a direction parallel to the vehicle body panel 110. One of the first fixing support portion 40 and the second fixing support portion 50 supports a top surface of the vehicle body panel 110 and the other supports a bottom surface of the vehicle body panel 110, with an assembly hole 115 formed in the vehicle body panel 110 being disposed therebetween. More specifically, the first fixing support portion 40 supports the bottom surface of the vehicle body panel 110 when the motor fixing portion 20 is rotated around the central axis 100 of the wiper motor unit fixed to the motor fixing portion 20. On the other hand, the second fixing support portion 50 supports the top surface of the vehicle body panel 110 when the motor fixing portion 20 is rotated around the central axis 100 of the wiper motor unit fixed to the motor fixing portion 20. The roles of the first fixing support portion 40 and the second fixing support portion 50 may be exchanged.

When viewed in a direction of the central axis 100, one of the first fixing support portion 40 and the second fixing support portion 50 may be disposed in a tangential direction to the rotating direction of the central axis 100. In the present exemplary embodiment, the first fixing support portion 40 is disposed in a tangential direction to the rotating direction of the central axis 100. In the present exemplary embodiment, the second fixing support portion 50 extends outward in a radial direction of the central axis 100. Therefore, when viewed in a longitudinal direction of the central axis 100, the first fixing support portion 40 and the second fixing support portion 50 may be disposed in a direction perpendicular to each other.

Each of the first fixing support portion 40 and the second fixing support portion 50 may include an elastic member. The elastic member 60 may include a flexible polymer material. For example, the elastic member 60 may include a rubber. The elastic member 60 may directly contact the vehicle body panel 110. The elastic member 60 may be integrally formed with the first fixing support portion 40 or the second fixing support portion 50 and may be formed to be separable from the first fixing support portion 40 or the second fixing support portion 50. In the present exemplary embodiment, the elastic member 60 is formed to be separable from the first fixing support portion 40 or the second fixing support portion 50.

The first fixing support portion 40 and the second fixing support portion 50 may include through-holes 42 and 52 for fixing the elastic members 60, respectively. The through-holes 42 and 52 may be formed to penetrate between the top surfaces and the bottom surfaces of the first fixing support portion 40 and the second fixing support portion 50, respectively.

The first fixing support portion 40 and the second fixing support portion 50 may include guide protrudes 44 and 54, respectively. When a flat support portion 62 of the elastic member 60 to be described below is coupled, the guide protrusions 44 and 54 may allow an operator to easily recognize an assembly position of the flat support portion 62. The guide protrusions 44 and 54 may be protrusions having a straight-line shape.

The elastic member 60 may include the flat support portion 62, a pillar portion 64, a release prevention portion 66, and a contact prevention portion 69.

The flat support portion 62 may be formed in a flat shape such that the flat support portion 62 comes into contact with the vehicle body panel 110. A part of a periphery of the flat support portion 62 is disposed along the guide protrusion 44 or 54, such that the flat support portion 62 is easily connected to the first fixing support portion 40 or the second fixing support portion 50.

The pillar portion 64 may be a rod-shaped structure that extends vertically from the flat support portion 62. In the present exemplary embodiment, the pillar portion 64 is formed to have a circular rod shape. The pillar portions 64 may pass through the through-holes 42 and 52 and protrude toward the outside of the first fixing support portion 40 and the second fixing support portion 50, respectively. The pillar portions 64 may be used as a grip when an operator assembles or disassembles the elastic members 60, thus improving workability.

The release prevention portion 66 may be disposed in the middle of the pillar portion 64. The release prevention portion 66 may be thicker than the through-hole 42 or 52. More specifically, the release prevention portion 66 may protrude outward from the outer peripheral surface of the pillar portion 64. The release prevention portion 66 may undergo compressive elastic deformation when passing through the through-holes 42 and 52. The release prevention portion 66 may prevent the pillar portion 64 from being released from the through-holes 42 and 52 in such a state that the pillar portions 64 are assembled with the through-holes 42 and 52. Consequently, the release prevention portion 66 may prevent the elastic members 60 from being released from the through-holes 42 and 52. The release prevention portion 66 may be configured such that an end portion in a direction in which the pillar portion 64 is assembled has a gentle slope, and an end portion in a direction in which the pillar portion 64 is disassembled has a sharp slope. Accordingly, it is possible to prevent the pillar portions 64 from being unexpectedly separated from the through-holes 42 and 52.

The flat support portion 62 may include an elastic deformation guide portion 68. The elastic deformation guide portions 68 may be formed to have a concave groove shape. The elastic deformation guide portion 68 may be formed at a location where the flat support portion 62 and the pillar portion 64 meet. The elastic deformation guide portion 68 may serve to form an elastic deformation space such that the compressive elastic deformation of the pillar portion 64 is effectively achieved during the process of assembling the pillar portions 64 into the through-holes 42 and 52. Therefore, the elastic deformation guide portion 68 may serve to guide the elastic deformation at the location where the flat support portion 62 and the pillar portion 64 meet.

The contact prevention portion 69 is a flange-shaped structure that extends from the edge of the flat support portion 62 in a direction perpendicular to the flat support portion 62. The contact prevention portion 69 may be disposed between the vehicle body panel 110 and the first fixing support portion 40 or between the vehicle body panel 110 and the second fixing support portion 50. The contact prevention portion 69 may prevent the first fixing support portion 40 or the second fixing support portion 50 from being damaged by the vehicle body panel 110. More specifically, the contact prevention portion 69 may prevent the edge of the vehicle body panel 110 from directly contacting the first fixing support portion 40 or the second fixing support portion 50.

According to another exemplary embodiment, as illustrated in FIGS. 5 to 8, the wiper motor unit assembly 10 may further include a reverse-rotation release prevention block.

The reverse-rotation release prevention block 80 may be formed at an end portion of at least one among the connection bridges 30. More specifically, the reverse-rotation release prevention block 80 may be disposed at an opposite side of the first fixing support portion 40 or the second fixing support portion 50. In the present exemplary embodiment, as illustrated in FIGS. 5 to 8, the reverse-rotation release prevention block 80 is disposed at the opposite side of the first fixing support portion 40. Since the reverse-rotation release prevention block 80 is rotated in an opposite direction to a direction of when the first fixing support portion 40 or the second fixing support portion 50 is assembled with the vehicle body panel 110, it is possible to prevent the first fixing support portion 40 or the second fixing support portion 50 from being released from the vehicle body panel 110. The reverse-rotation release prevention block 80 may include a flexible polymer material. For example, the reverse-rotation release prevention block 80 may include a material having good flexibility, such as a rubber.

The structure in which the reverse-rotation release prevention block 80 is installed will be described in more detail. As illustrated in FIG. 6, the reverse-rotation release prevention block 80 may be fitted into a coupling rod 70. The coupling rod 70 may protrude in a cantilever shape in an opposite direction to the first fixing support portion 40 or the second fixing support portion 50. In FIGS. 5 to 8, the coupling rod 70 protrudes in an opposite direction to the first fixing support portion 40. An arrowhead-shaped separation prevention stopper 72 may be provided in a free end portion of the coupling rod 70. The separation prevention stopper 72 may serve to prevent the reverse-rotation release prevention block 80 from being released in a longitudinal direction of the coupling rod 70.

The reverse-rotation release prevention block 80 may include a block body 81, a slot hole 82, a movement limitation portion 84, and a panel accommodation groove 86.

The block body 81 is a structure that fills an empty space formed in such a state that the first fixing support portion 40 and the second fixing support portion 50 are assembled with the vehicle body panel 110 through the assembly hole 115 provided in the vehicle body panel 110.

The slot hole 82 may be formed in the block body 81 and the coupling rod 70 may be fitted into the slot hole 82. The slot hole 82 may be formed to penetrate in a longitudinal direction of the coupling rod 70. The slot hole 82 may be an elongated hole that is formed in a longitudinal direction of the connection bridge 30. More specifically, the slot hole 82 is elongated in a direction of the central axis 100.

The movement limitation portion 84 may be provided on an inner wall of the slot hole 82. The movement limitation portion 84 may be formed to have a relatively small inner diameter in the middle of the slot hole 82. The movement limitation portion 84 may limit the movement of the coupling rod 70 along the slot hole 82 in a longitudinal direction of the connection bridge 30. The movement limitation portion 84 may be pushed into one side of the vehicle body panel 110 for temporary fixation, such that the first fixing support portion 40 and the second fixing support portion 50 are assembled with the vehicle body panel 110 without disturbance. When an external force having a predetermined magnitude or more is applied to the reverse-rotation release prevention block 80, the movement limitation portion 84 is elastically deformed so that the coupling rod 70 is movable along the inner wall of the slot hole 82. Therefore, after the first fixing support portion 40 and the second fixing support portion 50 are assembled with the vehicle body panel 110, an operator pushes the reverse-rotation release prevention block 80 into the vehicle body panel 110 with his or her fingers. In this way, the movement limitation portion 84 is elastically deformed and is moved toward the vehicle body panel 110 through the coupling rod 70. Consequently, the reverse-rotation release prevention block 80 is fixed to the vehicle body panel 110.

The panel accommodation groove 86 is a groove-shaped structure that accommodates an edge portion of the vehicle body panel 110. The panel accommodation groove 86 may be formed in a flange-shaped structure that extends from the block body 81.

Hereinafter, a process of assembling the wiper motor unit assembly 10 in the vehicle body panel 110 will be described.

Referring to FIGS. 1 to 4, according to the exemplary embodiment, the elastic members 60 are separably installed in the first fixing support portion 40 and the second fixing support portion 50. When the elastic members 60 are disassembled as illustrated in FIG. 2, the elastic members 60 are assembled with the first fixing support portion 40 and the second fixing support portion 50. The front ends of the pillar portions 64 of the elastic members 60 are inserted into the through-holes 42 and 52. By applying a force to the flat support portions 62, the pillar portions 64 are made to protrude toward the opposite sides through the through-holes 42 and 52. During this process, compressive elastic deformation occurs in the release prevention portions 66, and the release prevention portions 66 pass through the through-holes 42 and 52. The release prevention portions 66 having passed through the through-holes 42 and 52 prevent the pillar portions 64 from being released from the through-holes 42 and 52. In addition, the guide protrusions 44 and 54 provided in the first fixing support portion 40 and the second fixing support portion 50 serve to guide the flat support portions 62 such that the edges of the flat support portions 62 are installed at the predefined positions. By repeating the above-described processes, the elastic members 60 are connected to the first fixing support portion 40 and the second fixing support portion 50 provided at the end portions of the plurality of connection bridges 30, respectively. The wiper motor unit assembly 10 is approached toward the vehicle body panel 110 from one side of the vehicle body panel 110. When the connection bridges 30 are positioned corresponding to the assembly hole 115 provided in the vehicle body panel 110, the wiper motor unit assembly 10 is rotated around the central axis 100. The first fixing support portion 40 slides along the bottom surface of the vehicle body panel 110, and the second fixing support portion 50 slides along the top surface of the vehicle body panel 110. When one edge of the vehicle body panel 110 comes into contact with the contact prevention portion 69 provided in the first fixing support portion 40, the wiper motor unit assembly 10 does not rotate any more and the assembling process is completed.

On the other hand, the process of assembling the reverse-rotation release prevention block 80 as illustrated in FIGS. 5 to 8 will be described.

As illustrated in FIG. 6, the reverse-rotation release prevention block 80 is assembled with the coupling rod 70 in a state of being disassembled from the coupling rod 70. The reverse-rotation release prevention block 80 is tempo- rarily fixed in a direction in which the interference with the vehicle body panel 110 does not occur, so as to prevent disturbance in the process of assembling the first fixing support portion 40 and the second fixing support portion 50 with the vehicle body panel 110. By applying an external force to the reverse-rotation release prevention block 80 such that the coupling rod 70 is positioned at one side of the movement limitation portion 84, the reverse-rotation release prevention block 80 may be temporarily fixed at a position where the interference with the vehicle body panel 110 does not occur. By pushing the reverse-rotation release prevention block 80 toward the vehicle body panel 110 in such a state that the first fixing support portion 40 and the second fixing support portion 50 are fixed to the vehicle body panel 110, the panel accommodation groove 86 is connected to the edge of the vehicle body panel 110 and the reverse-rotation release prevention block 80 is fixed to the vehicle body panel 110. In the case of applying the external force exceeding the coupling force exerted by the first fixing support portion 40 and the second fixing support portion 50, the reverse-rotation release prevention block 80 prevents the wiper motor unit assembly 10 from being separated from the vehicle body panel 110.

As described above, according to the one or more of the above exemplary embodiments, the wiper motor unit assembly is configured such that the elastic members provided in the first fixing support portion and the second fixing support portion integrally formed with the connection bridges extending from the motor fixing portion support the lower portion and the upper portion of the vehicle body panel, respectively. Therefore, it is easy to assemble the wiper motor unit assembly and it is possible to effectively block a vibration between the vehicle body panel and the wiper motor unit. Furthermore, it is possible to absorb a vibration between the vehicle body panel and the wiper motor unit. Consequently, the wiper apparatus having good assembly stability may be provided. Furthermore, according to the one or more of the above exemplary embodiments, when the elastic member is configured to be easily assembled with or disassembled from the first fixing support portion or the second fixing support portion, the pillar portions, the release prevention portions, and the elastic deformation guide portions may collectively act to improve assemblability. Moreover, according to the one or more of the above exemplary embodiments, the reverse-rotation release prevention block may prevent the wiper motor unit assembly from being released from the vehicle body panel by an unexpected large external force.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A vehicle wiper motor unit assembly, which is fixed to a vehicle body panel of a vehicle and accommodates a wiper motor unit, comprising:

a motor fixing portion having a plurality of coupling holes that fix the wiper motor unit to the vehicle body panel;

a connection bridge that protrudes from the motor fixing portion toward the vehicle body panel; and a first fixing support portion and a second fixing support portion that are integrally formed with the connection bridge at end portions of the connection bridge and, when the motor fixing portion is rotated around a central axis of the wiper motor unit fixed to the motor fixing portion, respectively support a bottom surface of the vehicle body panel and a top surface of the vehicle body panel, wherein, when viewed in a direction of the central axis, one of the first fixing support portion and the second fixing support portion is disposed in a direction tangential to the central axis, and the other of the first fixing support portion and the second fixing support portion extends outward in a radial direction of the central axis, each of the first fixing support portion and the second fixing support portion includes an elastic polymer material, an elastic member is provided on and separable from the first fixing support portion or the second fixing support portion, a through-hole included in the first fixing support portion and a through-hole included in the second fixing support portion respectively fix the elastic member to the first fixing support portion and the second fixing support portion, and the elastic member includes:

a flat support portion that comes into contact with the vehicle body panel; and a pillar portion that passes through one of the through-holes and protrudes outward from the first fixing support portion or the second fixing support portion.

2. The vehicle wiper motor unit assembly of claim 1, further comprising a release prevention portion provided in a middle of the pillar portion, wherein the release prevention portion is thicker than the through-hole, undergoes compressive elastic deformation when passing through at least one of the through-holes, and prevents the elastic member from being released from the through-holes.

3. The vehicle wiper motor unit assembly of claim 1, wherein the flat support portion includes an elastic deformation guide portion that is concavely formed at a location where the flat support portion and the pillar portion meet, and guides elastic deformation.

4. The vehicle wiper motor unit assembly of claim 1, further comprising a guide protrusion provided in the first fixing support portion or the second fixing support portion and guiding an assembly position of the flat support portion.

5. The vehicle wiper motor unit assembly of claim 1, wherein the elastic member includes a contact prevention portion that prevents an edge of the vehicle body panel from directly contacting the first fixing support portion or the second fixing support portion.

* * * * *